United States Patent
Wang (10) Patent No.: US 11,281,175 B2
(45) Date of Patent: Mar. 22, 2022

(54) WIRELESS CONTROL MODULE, WIRELESS WALL SWITCH, POWERED DEVICE AND SYSTEM

(71) Applicant: Beijing Xiaomi Mobile Software Co., Ltd., Beijing (CN)

(72) Inventor: Huijun Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 170 days.

(21) Appl. No.: 16/696,288

(22) Filed: Nov. 26, 2019

(65) Prior Publication Data
US 2021/0003982 A1  Jan. 7, 2021

(30) Foreign Application Priority Data
Jul. 4, 2019 (CN) .......................... 201910600921.4

(51) Int. Cl.
*G05B 19/042* (2006.01)
*H01H 47/00* (2006.01)
(Continued)

(52) U.S. Cl.
CPC ......... *G05B 19/0425* (2013.01); *H01H 47/00* (2013.01); *H04W 4/80* (2018.02); *G05B 2219/24024* (2013.01); *H04W 84/12* (2013.01)

(58) Field of Classification Search
CPC ...... G05B 19/0425; G05B 2219/24024; G05B 19/0423; G05B 2219/25257;
(Continued)

(56) References Cited

U.S. PATENT DOCUMENTS

| 8,479,647 | B1 * | 7/2013 | Gomez | .................. B30B 9/321 100/35 |
| 2007/0126289 | A1 | 6/2007 | Liu et al. | |

(Continued)

FOREIGN PATENT DOCUMENTS

| AT | WO2018035548 | * 3/2018 |
| CN | 203909514 U | 10/2014 |

(Continued)

OTHER PUBLICATIONS

Extended European Search Report in counterpart EP Application No. 20163430.0.0 dated Nov. 5, 2020.
(Continued)

*Primary Examiner* — Toan T Vu
(74) *Attorney, Agent, or Firm* — Finnegan, Henderson, Farabow, Garrett & Dunner, L.L.P.

(57) ABSTRACT

A wireless control module includes: a main control module, a live wire connection/disconnection detection module, a wireless communication module and a control switch. The live wire connection/disconnection detection module is configured to detect a connection/disconnection state of a live wire coupled to a flash switch in series, and the flash switch is in a switch-off state when being pressed by external force and in a switch-on state when not being pressed by the external force. The wireless communication module is configured to receive a wireless control message and upload a current state of a powered device, and the wireless control message is configured to control an on/off state of the powered device. The main control module is configured to generate a control instruction for changing the current state of the powered device.

16 Claims, 10 Drawing Sheets (51) Int. Cl.
*H04W 4/80* (2018.01)
*H04W 84/12* (2009.01)

(58) Field of Classification Search
CPC ............... G05B 19/042; G05B 19/10; G05B 2219/2304; H04W 4/80; H04W 84/12; H01H 47/00; Y02E 60/00; Y04S 20/00; Y04S 40/126; Y02B 90/20; H02J 13/00026
USPC .......................................................... 307/80
See application file for complete search history.

(56) References Cited

U.S. PATENT DOCUMENTS

| | | |
|---|---|---|
| 2012/0201062 A1 | 8/2012 | Lee |
| 2013/0069617 A1 | 3/2013 | Lee |
| 2015/0245450 A1 | 8/2015 | Sung et al. |
| 2018/0116040 A1 | 4/2018 | Mann et al. |

FOREIGN PATENT DOCUMENTS

| | | | |
|---|---|---|---|
| CN | 204068971 U | | 12/2014 |
| CN | 204156836 U | | 2/2015 |
| CN | 105093988 A | | 11/2015 |
| CN | 105182802 A | | 12/2015 |
| CN | 105093988 B | | 7/2016 |
| CN | 206133241 | * | 4/2017 |
| CN | 107664969 A | | 2/2018 |
| CN | 105182802 B | | 4/2018 |
| CN | 108370627 A | | 8/2018 |
| CN | 208572482 U | | 3/2019 |
| CN | 109842985 A | | 6/2019 |
| CN | 109890115 A | | 6/2019 |
| JP | 2018039067 A | | 3/2018 |
| KR | 20100020162 A | | 2/2010 |
| RU | 2017131725 A | | 3/2019 |
| WO | WO 2018/035548 A1 | | 3/2018 |

OTHER PUBLICATIONS

English version of International Search Report in Application No. PCT/CN2019/108543, from the China National Intellectual Property Administration, Beijing, China, dated Mar. 26, 2020.
First Office Action of Russian Application No. 2019142664/07 dated Jun. 11, 2020.
International Search Report in International Application No. PCT/CN2019/108543, dated Mar. 26, 2020.

* cited by examiner

WIRELESS CONTROL MODULE, WIRELESS WALL SWITCH, POWERED DEVICE AND SYSTEM

CROSS-REFERENCE TO RELATED APPLICATIONS

The present application is based upon and claims priority to Chinese Patent Application No. 201910600921.4, filed on Jul. 4, 2019, the entire content of which is incorporated herein by reference.

TECHNICAL FIELD

The present disclosure relates to the field of intelligent control, and more particularly, to a wireless control module, a wireless wall switch, a powered device and a system.

BACKGROUND

A wireless control switch is a switch with a wireless control function, and is an important component in smart home. The wireless control function refers to a function that users may remotely control switch-on or switch-off of the wireless control switch through a remote control device such as a mobile phone, a tablet, or a computer, to realize the remote control of a powered device.

In the related art, the wireless control switch, a general mechanical switch, and the powered device are coupled in series in a circuit. The general mechanical switch needs to be brought into a close state, then the user can remotely control the powered device via the remote control device. When the general mechanical switch is brought into an open state, the wireless control switch is unable to work. Even if the wireless control switch receives a turn-on instruction sent by the user through the remote control device, the wireless control switch is still unable to turn on the powered device because the general mechanical switch is in the open state.

SUMMARY

Embodiments of the present disclosure provide a wireless control module, a wireless wall switch, a powered device and a system.

According to an aspect of the present disclosure, there is provided a wireless control module, including a main control module, a live wire connection/disconnection detection module coupled to the main control module, a wireless communication module coupled to the main control module, and a control switch coupled to the main control module. The live wire connection/disconnection detection module is configured to detect a connection/disconnection state of a live wire coupled to a flash switch in series, and the flash switch is in a switch-off state when being pressed by external force and in a switch-on state when not being pressed by the external force. The wireless communication module is configured to receive a wireless control message and upload a current state of a powered device, and the wireless control message is configured to control an on/off state of the powered device. The main control module is configured to generate a control instruction for changing the current state according to the connection/disconnection state of the live wire and the current state of the powered device, or maintain the current state of the powered device or generate the control instruction for changing the current state according to a remote control command instructed by the wireless control message; and output the control instruction to the control switch.

According to another aspect of the present disclosure, there is provided a wireless wall switch, including a flash switch and a wireless control module sequentially coupled in series between a first wiring terminal and a second wiring terminal. The wireless control module is the wireless control module according to the above aspect.

According to another aspect of the present disclosure, there is provided a powered device, including the wireless control module according to the above aspect.

According to another aspect of the present disclosure, there is provided a wireless control system, including a flash switch, a wireless control module and a powered device sequentially coupled in series between a live wire and a null line. The wireless control module is the wireless control module according to the above aspect.

According to another aspect of the present disclosure, there is provided a wireless control system, including a flash switch and a powered device sequentially coupled in series between a live wire and a null line. The powered device includes the wireless control module according to the above aspect.

The technical solution provided by the embodiments of the present disclosure can have the following beneficial effects.

The live wire connection/disconnection detection module and the flash switch are used together, and a signal generated when the flash switch is pressed by the user is identified according to the connection/disconnection state of the live wire detected by the live wire connection/disconnection detection module, and then the turn-on state or the turn-off state of the powered device is controlled. On one hand, the flash switch is used in a way similar to that of a general mechanical switch, and the users do not need to change their own habits; and on the other hand, the continuous operating of the wireless control module is ensured, even where the powered device is in the turn-off state, the wireless control module may be used to turn on the powered device again as the user desired, which solves the problem in the related art that the wireless control switch cannot turn on the powered device when the general mechanical switch is in an open state.

It is to be understood that both the foregoing general description and the following detailed description are exemplary and explanatory only and are not restrictive of the present disclosure.

BRIEF DESCRIPTION OF THE DRAWINGS

The accompanying drawings herein which are incorporated into and constitute part of the description, illustrate the embodiments according to the present disclosure, and serve to explain the principles of the present disclosure together with the description.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the disclosure as recited in the appended claims.

In embodiments of the present disclosure, a live wire is one of civil power supply lines that has an alternating current (AC) power supply voltage, e.g., 220 volts, and different countries have different voltage values. A null line is one of civil power supply lines that has a grounding voltage.

In embodiments of the present disclosure, a general mechanical switch can be brought into any of first and second states, including a close state and an open state. An initial state of the general mechanical switch is the open state, and when the general mechanical switch is coupled in series to a live wire of an electric lamp, for example, the mechanical switch is changed from the open state to the close state after it is pressed by a user for one time, and the electric lamp is turned on. The general mechanical switch is switched from the close state to the open state after it is pressed by the user once more, and then the electric light goes off.

In embodiments of the present disclosure, a flash switch is a switch that is in a switch-on state under normal condition. When the flash switch is pressed by an external force, it is brought into a switch-off state for a period of time during which the external force is being applied, and when the external force disappears, it returns to the switch-on state again.

The present disclosure provides a wireless control module that can be used together with a flash switch. In an application scenario in which a common mechanical switch is replaced with a flash switch, the wireless control module and the flash switch are coupled in series in a live wire at the same time, and the wireless control module can maintain a normal working state. Thus, the following two control modes may be implemented.

The first control mode is a manual control mode in which the flash switch is used in a similar way to that of the general mechanical switch. After the user presses the flash switch once, the state of the powered device switches between a turn-on state and a turn-off state. That is, when the user presses the flash switch for the $i^{th}$ time, the powered device is changed to the turn-off state; and after the user presses the flash switch for the $(i+1)^{th}$ time, the powered device is changed to the turn-on state.

The second control mode is a wireless control mode in which a remote control device is used for control through a wireless control message. The user sends the wireless control message to the wireless control module using a wireless remote control device (such as a remote control, a mobile phone with a remote control APP installed therein, or a mobile phone with a smart home APP installed therein), and when the wireless control message instructs the turn-on state, the wireless control module controls the powered device to enter the turn-on state; and when the wireless control message instructs the turn-off state, the wireless control module controls the powered device to enter the turn-off state.

Figure 1:
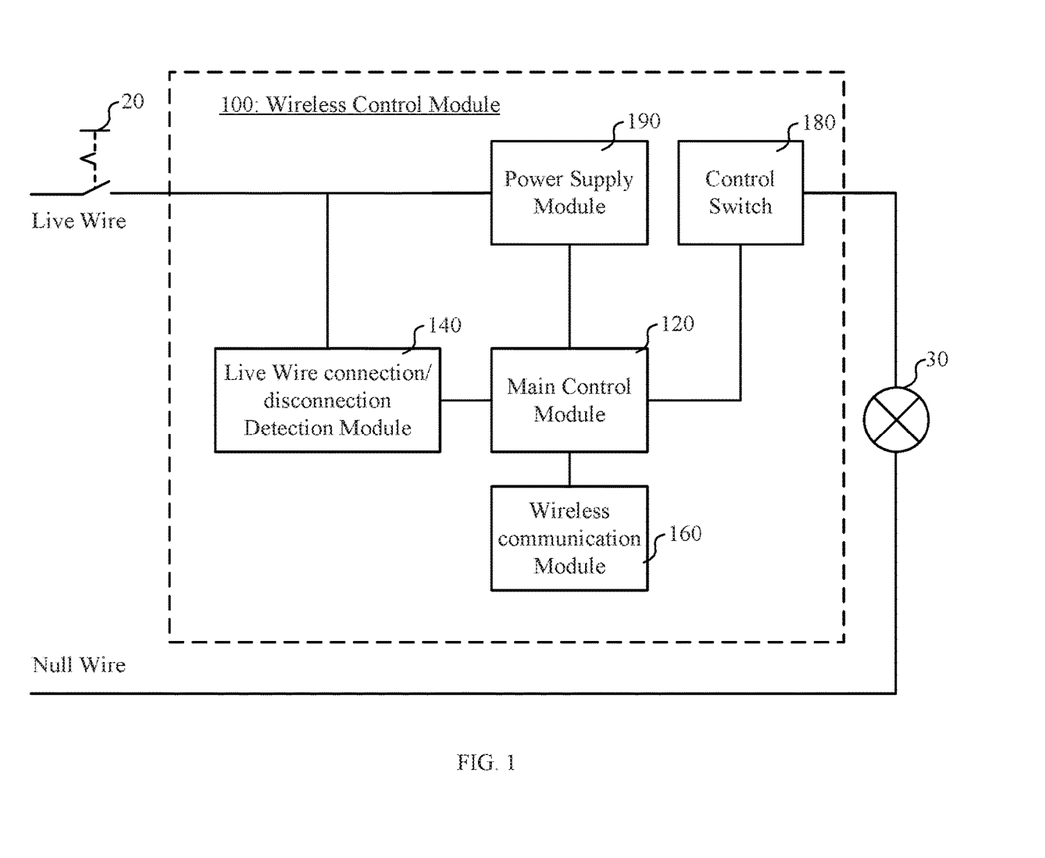
FIG. 1 is a schematic diagram illustrating a wireless control module according to an exemplary embodiment.

FIG. 1 is a schematic diagram illustrating a wireless control module 100 according to an exemplary embodiment. The wireless control module 100 includes a main control module 120, a live wire connection/disconnection detection module 140, a wireless communication module 160, and a power supply module 190. The main control module 120 is respectively coupled to the live wire connection/disconnection detection module 140, the wireless communication module 160, and a control switch 180.

The live wire connection/disconnection detection module 140 is configured to detect a connection/disconnection state of a live wire which is coupled to a flash switch 20 in series. The flash switch 20 is a switch that is in a switch-off state when being pressed by external force and in a switch-on state when not being pressed by the external force.

The wireless communication module 160 is configured to receive a wireless control message which is used for controlling an on/off state of a powered device 30. The wireless communication module 160 is configured to upload a current state (a turn-on state or a turn-off state) of the powered device.

The main control module 120 is configured to generate a control instruction for changing the current state according to the connection/disconnection state of the live wire and the current state of the powered device 30, or maintain the current state of the powered device 30, or generate the control instruction for changing the current state according to a remote control command instructed by the wireless control message; and output the control instruction to the control switch 180.

The power supply module 190 is configured to convert an alternating current in the live wire into a direct current, output the direct current to at least one of the main control module 120, the live wire connection/disconnection detection module 140, the wireless communication module 160, and the control switch 180 for power supply. For example, the power supply module 190 supplies power to the modules in the wireless control module 100 that need to be powered.

I. Manual Control Mode

A user can press the flash switch 20 to change an operating state of the powered device. For example, the live wire will be disconnected when the flash switch 20 is pressed. The main control module 120 is configured to generate the control instruction for changing the current state to the turn-off state when the disconnection state of the live wire is detected and the current state of the powered device 30 is the turn-on state; and generate the control instruction for changing the current state to the turn-on state when the disconnection state of the live wire is detected and the current state of the powered device 30 is the turn-off state.

Also for example, the current state of the powered device 30 is stored in the main control module 120 in a non-volatile storage mode through which the stored data will not be lost when there is a power failure. In the meanwhile, the main control module 120 has the ability to automatically start after it is powered off and re-energized. When the flash switch 20 is pressed, the live wire is disconnected, and the main control module 120 is forcibly shut down, but the current state of the powered device 30 before shut-down is cached in the main control module 120. When the pressing of the flash switch 20 stops, the live wire is reconnected, and the main control module 120 is automatically started again. After being automatically restarted, the main control module 120 generates the control instruction for changing the current state of the powered device according to the cached current state of the powered device 30 and the disconnection state of the live wire detected by the live wire connection/disconnection detection module 140.

II. Wireless Control Mode

The main control module 120 is configured to maintain the current state of the powered device 30 when the wireless control message instructs the turn-on state and the current state of the powered device 30 is the turn-on state.

The main control module 120 is configured to generate the control instruction for changing the current state to the turn-on state when the wireless control message instructs the turn-on state and the current state of the powered device 30 is the turn-off state.

The main control module 120 is configured to maintain the current state of the powered device 30 when the wireless control message instructs the turn-off state and the current state of the powered device 30 is the turn-off state.

The main control module 120 is configured to generate the control instruction for changing the current state to the turn-off state when the wireless control message instructs the turn-off state and the current state of the powered device 30 is the turn-on state.

In the above embodiments, the wireless control module is provided with the live wire connection/disconnection detection module and the flash switch which are used together, and identifies a signal generated when the flash switch is pressed by the user according to the connection/disconnection state of the live wire detected by the live wire connection/disconnection detection module, and then controls the turn-on state or the turn-off state of the powered device. On one hand, the flash switch is used in a way similar to that of a general mechanical switch, and the users do not need to change their own habits; and on the other hand, the continuous operating of the wireless control module is ensured, even where the powered device is in the turn-off state, the wireless control module may be used to turn on the powered device again as the user desired, which solves the problem in the related art that the wireless control switch cannot turn on the powered device when the general mechanical switch is in an open state.

In an embodiment based on FIG. 1, the main control module 120 is respectively coupled to the live wire connection/disconnection detection module 140, the wireless communication module 160, the control switch 180, and the power supply module 190.

The main control module 120 is a control module in the wireless control module 100. The main control module 120 may be implemented as a microprocessor or a chip. This embodiment will be described by way of example, in which the main control module 120 is the chip.

The live wire connection/disconnection detection module 140 is a circuit for detecting the connection/disconnection state of the live wire. The live wire connection/disconnection detection module 140 may be implemented by using a peripheral circuit of the main control module 120, or an analog-to-digital converter of the main control module 120 (or an analog-to-digital converter separately provided from the main control module 120). For example, an output terminal of the live wire connection/disconnection detection module 140 is coupled to an input terminal (input pin) of the main control module 120.

In an embodiment, when an output level of the live wire connection/disconnection detection module 140 is a first level (e.g., a high level), the connection/disconnection state of the live wire detected by the main control module 120 is a connection state; and when the output level of the live wire connection/disconnection detection module 140 is a second level (e.g., a low level), the connection/disconnection state of the live wire detected by the main control module 120 is a disconnection state.

The wireless communication module 160 includes, but is not limited to, at least one of the following modules: a communication module having a Zigbee function, a communication module having a Bluetooth Low Energy (BLE) function, a communication module having a Wireless Fidelity (WIFI) network function and a communication module having an infrared remote control function.

An output terminal of the wireless communication module 160 is coupled to the input terminal (input pin) of the main control module 120. In some embodiments, the wireless communication module 160 may also be integrated in the main control module 120 as part of the main control module 120.

A control terminal of the control switch 180 is coupled to an output terminal of the main control module 120. For example, the control switch 180 is a relay, or other electronically controllable switches.

The power supply module 190 is configured to convert an alternating current in the live wire into a direct current, output the direct current to at least one of the main control module 120, the live wire connection/disconnection detection module 140, the wireless communication module 160, and the control switch 180 for power supply. For example, the power supply module 190 supplies power to the modules in the wireless control module 100 that need to be powered.

In an embodiment, the power supply module 190 includes a rectifier circuit and a voltage reducing circuit, the rectifier circuit is configured to convert an alternating current in the live wire into a direct current, and the voltage reducing circuit is configured to reduce (and filter) the voltage of the direct current and output it to the individual modules in the wireless control module 100 that need to be powered. In an embodiment, the power supply module 190 includes a battery or a battery pack, such as an AAA battery or an AA battery, which supplies power to the individual modules in the wireless control module 100 that need to be powered. In an embodiment, the power supply module 190 includes a rectifier circuit, a voltage reducing circuit and a battery, the rectifier circuit and the voltage reducing circuit supply power to some of the modules in the wireless control module 100, and the battery supplies power to the other modules in the wireless control module 100. For example, the rectifier circuit and the voltage reducing circuit supply power to the wireless communication module 160, and the battery supplies power to the main control module 120. In an embodiment, when a rectifier circuit is provided in the live wire connection/disconnection detection module 140, the power supply module 190 may share the rectifier circuit with the live wire connection/disconnection detection module 140, or may be provided with another rectifier circuit by itself, which is not limited by the embodiments of the present disclosure.

Figure 2:
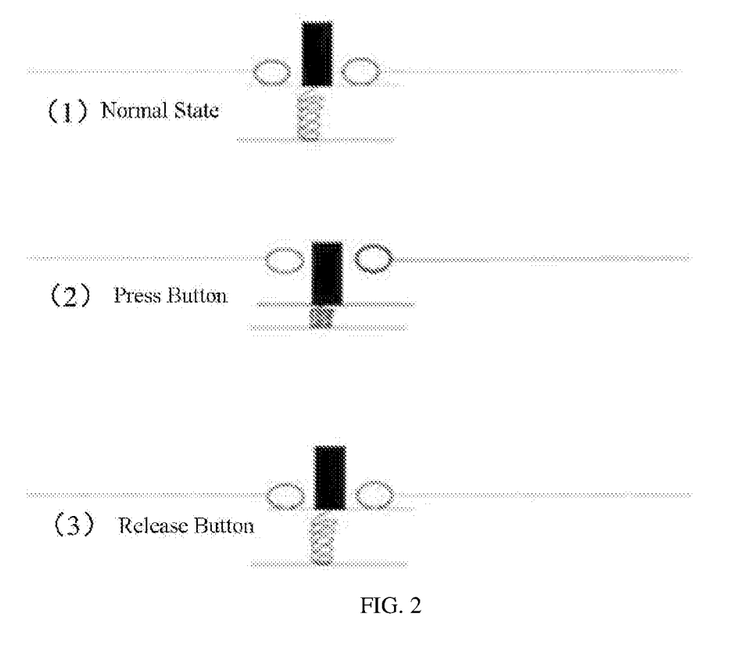
FIG. 2 is a schematic diagram illustrating a flash switch according to an exemplary embodiment.

The live wire connection/disconnection detection module 140 is configured to detect the connection/disconnection state of the live wire which is coupled to the flash switch 20 in series, where the flash switch 20 is a switch that is in a switch-off state when being pressed by external force and in a switch-on state when not being pressed by the external force. In an embodiment, the flash switch 20 can be implemented using a spring pressing component. Referring to (1) in FIG. 2, in a normal state, the flash switch is in the switch-on state; after a user presses its button, the flash switch is in the switch-off state, as illustrated in (2) of FIG. 2; and after the user releases the button, the flash switch returns to the switch-on state, as illustrated in (3) of FIG. 2. In use, the user may press the flash switch briefly, for example, for 0.5 seconds. In an embodiment, the live wire connection/disconnection detection module 140 outputs to the main control module 120 an interrupt signal which is, for example, at low level, when the connection/disconnection state of the live wire is the disconnection state.

Referring back to FIG. 1, the wireless communication module 160 is configured to receive a wireless control message which is used for controlling an on/off state of the powered device 30. The wireless communication module 160 is configured to upload the current state (the turn-on state or the turn-off state) of the powered device.

The main control module 120 is configured to generate a control instruction for changing the current state according to the connection/disconnection state of the live wire and the current state of the powered device 30.

The main control module 120 is configured to maintain the current state of the powered device 30 according to a remote control command instructed by the wireless control message, or generate the control instruction for changing the current state according to the remote control command instructed by the wireless control message; and output the control instruction to the control switch 180.

I. Manual Control Mode

A user may press the flash switch 20 to change an operating state of the powered device.

For example, the live wire will be disconnected when the flash switch 20 is pressed. The main control module 120 is configured to generate the control instruction for changing the current state to the turn-off state when the disconnection state of the live wire is detected and the current state of the powered device 30 is the turn-on state; and generate the control instruction for changing the current state to the turn-on state when the disconnection state of the live wire is detected and the current state of the powered device 30 is the turn-off state.

Also for example, the current state of the powered device 30 is stored in the main control module 120 in a non-volatile storage mode through which the stored data will not be lost when there is a power failure. In the meanwhile, the main control module 120 has the ability to automatically start after it is powered off and re-energized. When the flash switch 20 is pressed, the live wire is disconnected, and the main control module 120 is forcibly shut down, but the current state of the powered device 30 before the shut-down is cached in the main control module 120. When the pressing of the flash switch 20 stops, the live wire is reconnected, and the main control module 120 is automatically started again. After being automatically restarted, the main control module 120 generates the control instruction for changing the current state of the powered device according to the cached current state of the powered device 30 and the disconnection state of the live wire detected by the live wire connection/disconnection detection module 140.

For instance, the powered device 30 is an electric lamp with an initial state of being turned-off, when a user presses the flash switch for one time, the electric lamp is turned on; and when the user presses the flash switch once again, the electric lamp goes off.

II. Wireless Control Mode

The main control module 120 is configured to maintain the current state of the powered device 30 when the wireless control message instructs the turn-on state and the current state of the powered device 30 is the turn-on state.

The main control module 120 is configured to generate the control instruction for changing the turn-off state to the turn-on state when the wireless control message instructs the turn-on state and the current state of the powered device 30 is the turn-off state.

The main control module 120 is configured to maintain the current state of the powered device 30 when the wireless control message instructs the turn-off state and the current state of the powered device 30 is the turn-off state.

The main control module 120 is configured to generate the control instruction for changing the turn-on state to the turn-off state when the wireless control message instructs the turn-off state and the current state of the powered device 30 is the turn-on state.

The current state of the powered device 30 can be determined by a state of the control switch 180. When the control switch 180 is a relay and is in a switch-on state, the main control module 120 determines that the current state of the powered device 30 is the turn-on state; and when the control switch 180 is the relay and is in a switch-off state, the main control module 120 determines that the current state of the powered device 30 is the turn-off state.

In the above embodiments, the wireless control module is provided with the live wire connection/disconnection detection module and the flash switch which are used together, and identifies a signal generated when the flash switch is pressed by the user according to the connection/disconnection state of the live wire detected by the live wire connection/disconnection detection module, and then controls the turn-on state or the turn-off state of the powered device. On one hand, the flash switch is used in a way similar to that of a general mechanical switch, and the users do not need to change their own habits; and on the other hand, the continuous operating of the wireless control module is ensured, even where the powered device is in the turn-off state, the wireless control module may be used to turn on the powered device again as the user desired, which solves the problem in the related art that the wireless control switch cannot turn on the powered device when the general mechanical switch is in an open state.

Figure 3:
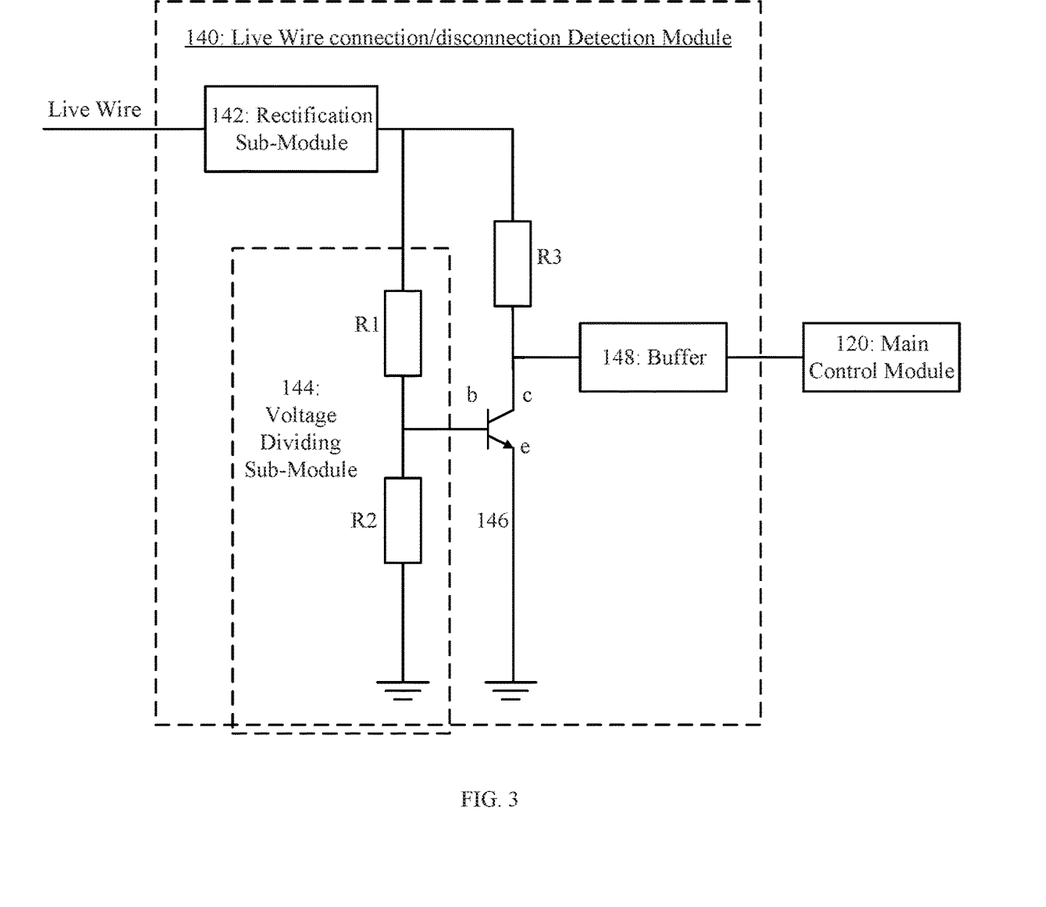
FIG. 3 is a schematic diagram illustrating a live wire connection/disconnection detection module according to an exemplary embodiment.

In an embodiment based on FIG. 1, as illustrated in FIG. 3, the live wire connection/disconnection detection module 140 includes a rectification sub-module 142, a voltage dividing sub-module 144, a switch tube 146, and a buffer 148.

An input terminal of the rectification sub-module 142 is coupled to the live wire. The rectification sub-module 142 is configured to rectify the alternating current in the live wire to the direct current.

An output terminal of the rectification sub-module 142 is coupled to an input terminal of the voltage dividing sub-module 144. The voltage dividing sub-module 144 includes a first resistor R1 and a second resistor R2, one end of the first resistor R1 is coupled to the output terminal of the rectification sub-module 142, the other end of the first resistor R1 is coupled to one end of the second resistor R2, and the other end of the second resistor R2 is grounded. An output terminal of the voltage dividing sub-module 144 is disposed between the first resistor R1 and the second resistor R2, and is coupled to a control terminal b of the switch tube 146. A first connection terminal c of the switch tube 146 is coupled to an input terminal of the main control module 120, and a second connection terminal e of the switch tube 146 is grounded. In an embodiment, the first connection terminal c of the switch tube 146 is also coupled to the output terminal of the rectification sub-module 142 through a third resistor.

The switch tube 146 is configured to be in a switch-on state when the live wire is in a connection state and in a switch-off state when the live wire is in a disconnection state, and output an interrupt signal at low level.

The buffer 148 is configured to delay the output signal of the switch tube 146 for a target duration and then input it to the main control module 120. For example, the target duration is greater than a sum of an empirical value and a startup duration. The empirical value is an empirical value of a duration for which a user presses the flash switch, and can be determined by calculating an average value of a large number of collected pressing durations for which the users press the flash switch; and the startup duration is a duration taken for the main control module 120 to be automatically started to come to an operating state after it is powered.

Figure 4:
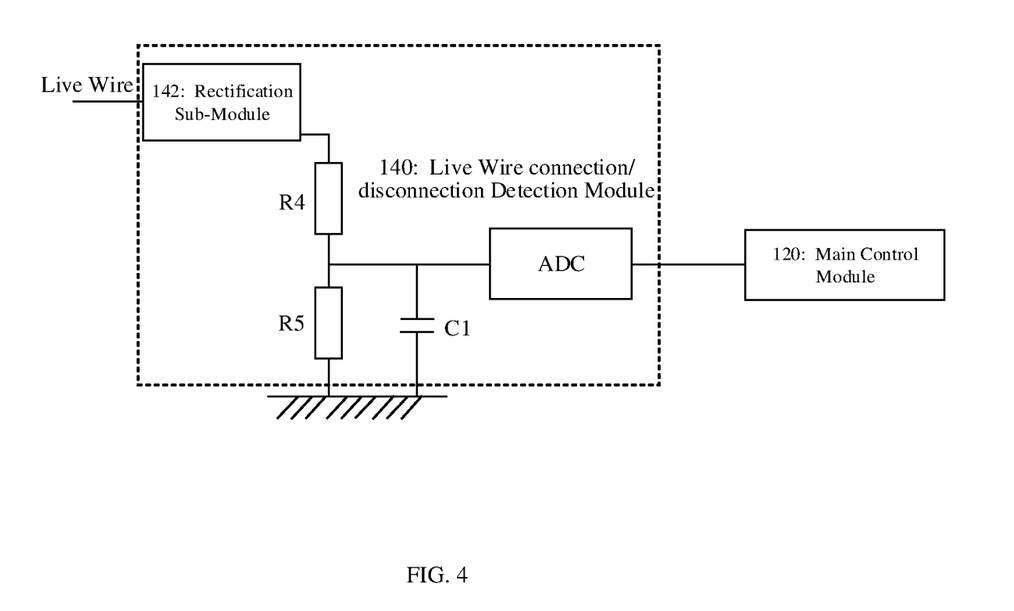
FIG. 4 is a schematic diagram illustrating a live wire connection/disconnection detection module according to another exemplary embodiment.

In another embodiment based on FIG. 1, as illustrated in FIG. 4, the live wire connection/disconnection detection module 140 includes a rectification sub-module 142, an RC circuit and an analog-to-digital converter ADC.

An input terminal of the rectification sub-module 142 is coupled to the live wire, and an output terminal of the rectification sub-module 142 is coupled to an input terminal of the RC circuit.

An input terminal of the analog-to-digital converter ADC is coupled to the rectification sub-module 142 through the RC circuit, and an output terminal of the analog-to-digital converter ADC is coupled to an input terminal of the main control module 120.

The RC circuit includes a fourth resistor R4, a fifth resistor R5 and a capacitor Cl, one end of the fourth resistor R4 is coupled to the output terminal of the rectification sub-module 142, the other end of the fourth resistor R4 is coupled to one end of the fifth resistor R5, and the other end of the fifth resistor R5 is grounded. Connection between the fourth resistor R4 and the fifth resistor R5 is grounded through the capacitor Cl, and is also coupled to the input terminal of the analog-to-digital converter ADC as an output terminal of the RC circuit.

The analog-to-digital converter ADC is configured to output a value that is used to indicate a duration of power failure of the live wire. When the duration of power failure indicated by the value is less than a threshold, it indicates that the flash switch is pressed; and when the duration of power failure indicated by the value is greater than the threshold, it is indicative of the blackout of the power grid or prolonged power outage during maintenance.

The specific implementations of the live wire connection/disconnection detection module 140 are not limited in the embodiments of the present application.

Figure 5:
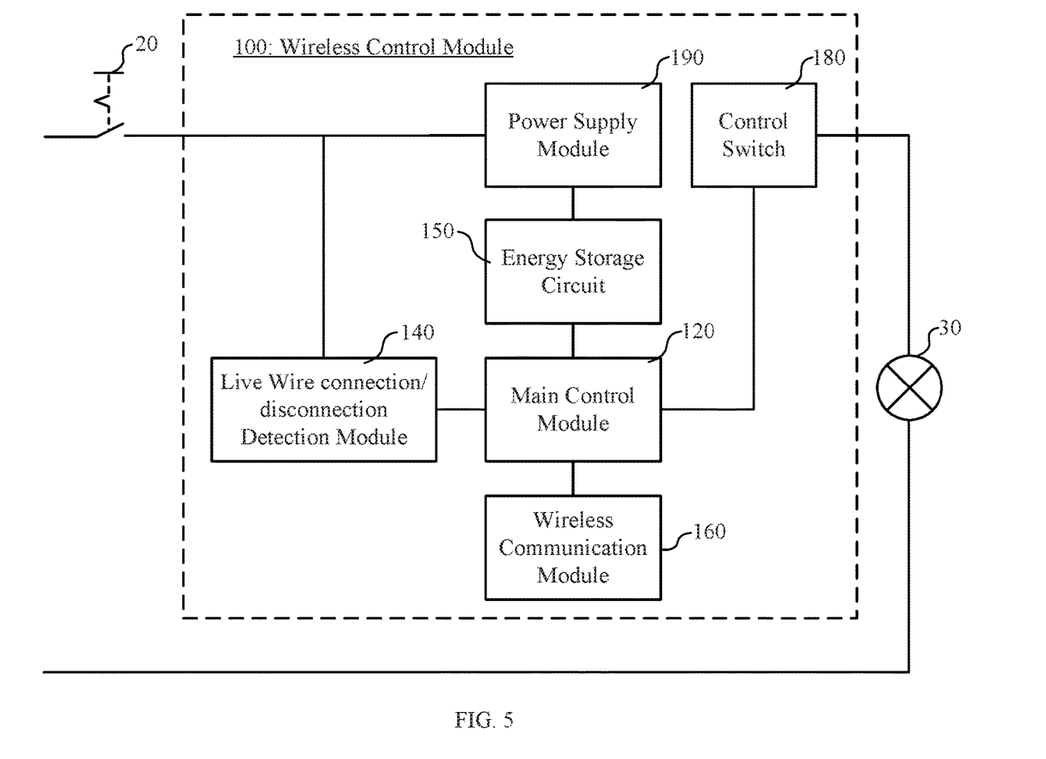
FIG. 5 is a schematic diagram illustrating a wireless control module according to another exemplary embodiment.

Since the wireless control module 100 may be unable to function due to its out-of-supply in a short period of time when the flash switch is pressed, in another embodiment based on FIG. 1, the wireless control module 100 further includes an energy storage circuit 150, as illustrated in FIG. 5. An energy storage element which may be a small rechargeable battery or capacitor is disposed in the energy storage circuit 150. The energy storage circuit 150 is configured to store electric energy provided by the power supply module 190 to the energy storage element when the connection/disconnection state of the live wire is a connection state; and supply power to at least one of the main control module 120, the live wire connection/disconnection detection module 140, the wireless communication module 160, and the control switch 180 through the energy storage element when the connection/disconnection state of the live wire is a disconnection state. Therefore, in the embodiment, even if the flash switch 20 is pressed, the main control module 120 can ensure proper functioning under power supply of the energy storage circuit 150 without being shut down and then restarted.

Figure 6:
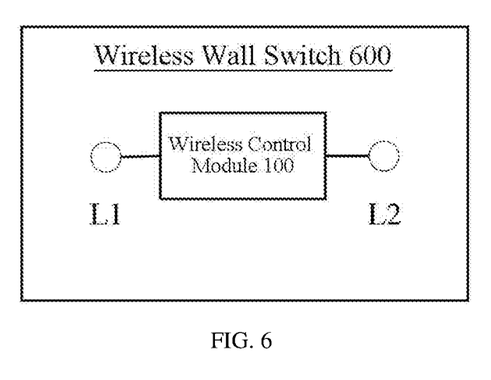
FIG. 6 is a block diagram illustrating a wireless wall switch according to an exemplary embodiment.

FIG. 6 is a block diagram illustrating a wireless wall switch 600 according to an exemplary embodiment. The wireless wall switch 600 includes the wireless control module 100 described above. The wireless control module 100 can be separately implemented as the wireless wall switch 600.

The wireless wall switch 600 can be a type-86 wall switch. The wireless wall switch 600 includes a housing, the wireless control module 100 built in the housing, and two wiring terminals L1 and L2 provided at the back of the housing. A user may purchase the wireless wall switch 600 solely and connect the flash switch and the wireless wall switch 600 in series to a live wire.

In the embodiment, the flash switch can be separately designed as another type-86 wall switch. A safety switch is provided in the flash switch. The safety switch is operated in a cut-off state in which a pathway between the two wiring terminals is disconnected, or in a maintaining state in which the pathway between the two wiring terminals is connected. The safety switch can be implemented as a button or a side-push button on the type-86 wall switch.

Since the type-86 wall switches are used, it is easy for users to purchase and install them in their homes, which is convenient for the construction of a smart home system. In addition, the above-mentioned safety switch is used when the powered device is replaced or repaired.

Figure 7A:
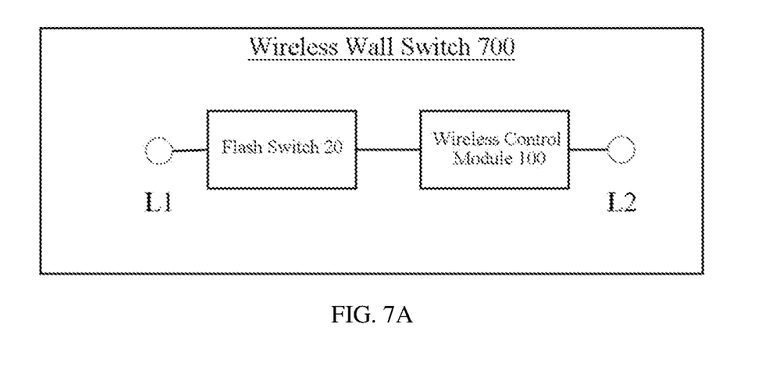
FIGS. 7A-7C are block diagrams illustrating a wireless wall switch according to exemplary embodiments.
Figure 7B:
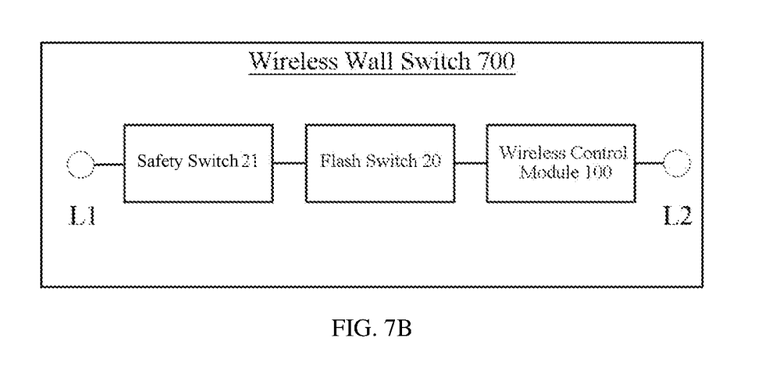
Figure 7C:
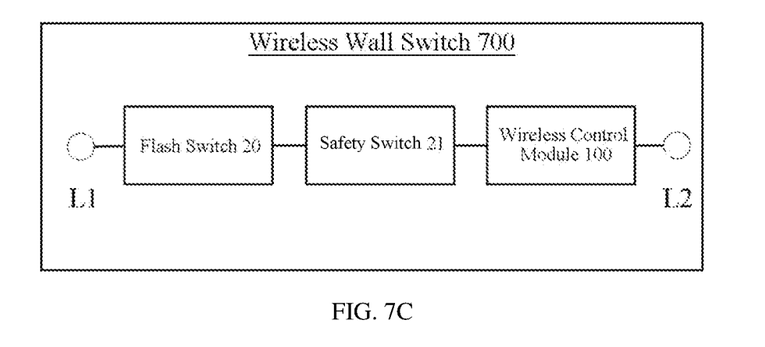

FIGS. 7A-7C are block diagram illustrating a wireless wall switch 700 according to exemplary embodiments. In an embodiment shown in FIG. 7A, the wireless wall switch 700 includes the flash switch 20 and the wireless control module 100 described above that are sequentially coupled in series between a first wiring terminal L1 and a second wiring terminal L2. The flash switch 20 and the wireless control module 100 can be integrated into the same wireless wall switch.

The wireless wall switch 700 can be a type-86 wall switch. The wireless wall switch 700 includes a housing, the flash switch 20 and the wireless control module 100 built in the housing, and the two wiring terminals L1 and L2 provided at the back of the housing. A user may purchase the wireless wall switch 700 and connect it in series to a live wire.

In an embodiment shown in FIG. 7B, the wireless wall switch 700 further includes a safety switch 21. The safety switch 21 is coupled in series between the first wiring terminal L1 and the flash switch 20. In an embodiment shown in FIG. 7C, the safety switch 21 is coupled in series between the flash switch 20 and the wireless control module 100. The safety switch 21 is operated in a cut-off state in which a pathway between the first wiring terminal L1 and the second wiring terminal L2 is disconnected, or in a maintaining state (normal state) in which the pathway between the first wiring terminal L1 and the second wiring terminal L2 is connected. The safety switch 21 can be implemented as a button or a side-push button on the type-86 wall switch. The safety switch 21 is used when the powered device is replaced or repaired.

Figure 8:
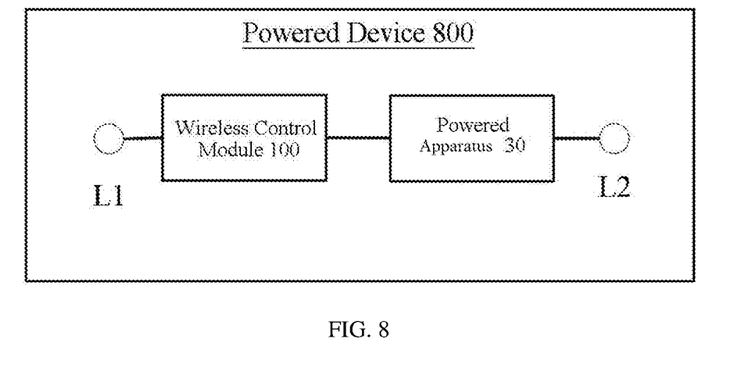
FIG. 8 is a block diagram illustrating a powered device according to an exemplary embodiment.

FIG. 8 is a block diagram illustrating a powered device 800 according to an exemplary embodiment. The powered device 800 may be a smart home device such as an electric lamp, a television, an electric fan, a bread machine, or a coffee machine. The powered device 800 includes the wireless control module 100 described above.

In an embodiment, the powered device 800 includes a powered apparatus 30. The wireless control module 100 and the powered apparatus 30 are coupled in series between the two wiring terminals L1 and L2, which can be implemented as power sockets.

Figure 9:
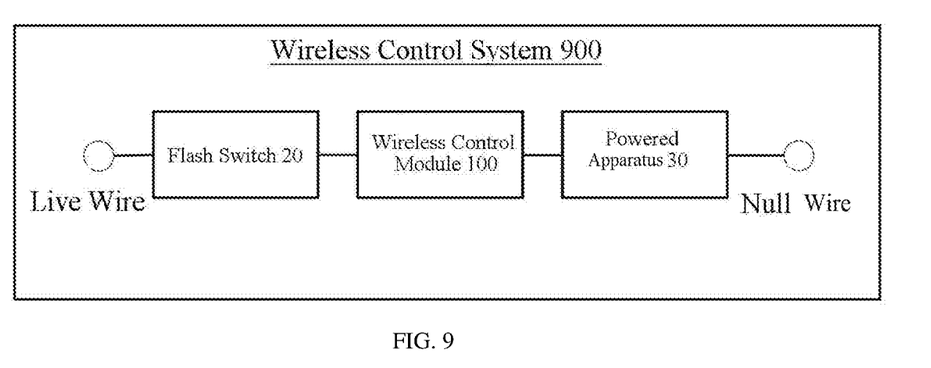
FIG. 9 is a block diagram illustrating a wireless control system according to an exemplary embodiment.

FIG. 9 is a block diagram illustrating a wireless control system 900 according to an exemplary embodiment. The wireless control system 900 includes the flash switch 20, the wireless control module 100, and the powered apparatus 30 sequentially coupled in series between a live wire and a null wire.

The wireless control module 100 is any of the wireless control module 100 described above.

Figure 10:
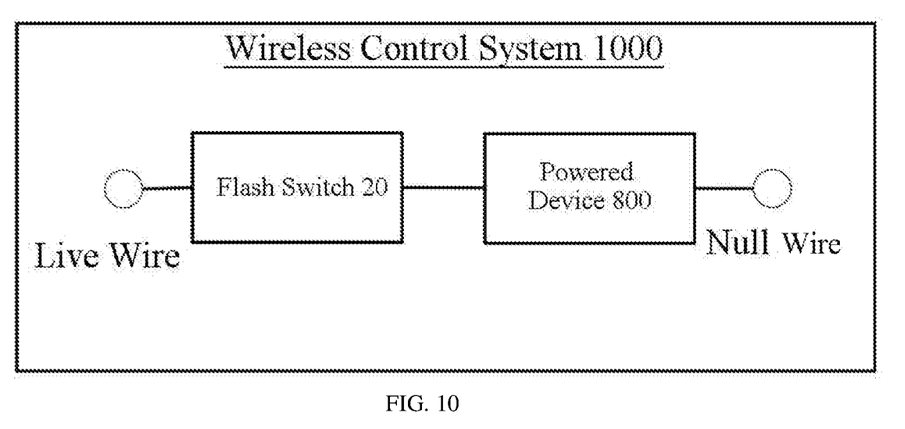
FIG. 10 is a block diagram illustrating a wireless control system according to an exemplary embodiment.

FIG. 10 is a block diagram illustrating a wireless control system 1000 according to an exemplary embodiment. The wireless control system 1000 includes the flash switch 20 and the powered device 800 (FIG. 8) sequentially coupled in series between a live wire and a null wire.

In some embodiments, each of the above described modules and sub-modules may be implemented with hardware, or software, or a combination of hardware and software. In some embodiments, each of the above described modules and sub-modules may be implemented with circuitry.

Other embodiments of the present disclosure will be apparent to those skilled in the art from consideration of the specification and upon practice of the invention disclosed herein. This application is intended to cover any variations, uses, or adaptations of the disclosure following the general principles thereof and including such departures from the present disclosure as come within known or customary practice in the art. It is intended that the specification and embodiments be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A wireless control module, comprising:
a main control module, a live wire connection/disconnection detection module coupled to the main control module, a wireless communication module coupled to the main control module, and a control switch coupled to the main control module, wherein:
the live wire connection/disconnection detection module is configured to detect a connection/disconnection state of a live wire coupled to a flash switch in series, wherein the flash switch is in a switch-off state when being pressed by external force and in a switch-on state when not being pressed by the external force;
the wireless communication module is configured to receive a wireless control message and upload a current state of a powered device, wherein the wireless control message is configured to control an on/off state of the powered device; and
the main control module is configured to perform at least one of:
generating, according to the connection/disconnection state of the live wire and the current state of the powered device, a control instruction for changing the current state; or
maintaining the current state of the powered device or generating the control instruction for changing the current state according to a remote control command instructed by the wireless control message; and
output the control instruction to the control switch;
wherein the live wire connection/disconnection detection module comprises a rectification sub-module, a voltage dividing sub-module, a switch tube, and a buffer, wherein
an input terminal of the rectification sub-module is coupled to the live wire, an output terminal of the rectification sub-module is coupled to an input terminal of the voltage dividing sub-module, an output terminal of the voltage dividing sub-module is coupled to a control terminal of the switch tube, a first connection terminal of the switch tube is coupled to an input terminal of the main control module, and a second connection terminal of the switch tube is grounded;
the switch tube is configured to be in a switch-on state when the live wire is in a connection state and to be in a switch-off state when the live wire is in a disconnection state; and
the buffer is configured to delay an output signal of the switch tube for a target duration and then input the output signal to the main control module;
or
wherein the live wire connection/disconnection detection module comprises a rectification sub-module, a resister-capacitor RC circuit and an analog-to-digital converter, wherein
an input terminal of the rectification sub-module is coupled to the live wire, and an output terminal of the rectification sub-module is coupled to an input terminal of the resister-capacitor RC circuit; and
an input terminal of the analog-to-digital converter is coupled to the rectification sub-module through the RC circuit, and an output terminal of the analog-to-digital converter is coupled to an input terminal of the main control module.

2. The wireless control module according to claim 1, wherein:
the main control module is configured to generate the control instruction for changing the current state to a turn-off state when a disconnection state of the live wire is detected and the current state of the powered device is a turn-on state; and
the main control module is configured to generate the control instruction for changing the current state to the turn-on state when the disconnection state of the live wire is detected and the current state of the powered device is the turn-off state.

3. The wireless control module according to claim 1, wherein:
the main control module is configured to maintain the current state of the powered device when the wireless control message instructs a turn-on state and the current state of the powered device is the turn-on state;

the main control module is configured to generate the control instruction for changing the current state to the turn-on state when the wireless control message instructs the turn-on state and the current state of the powered device is a turn-off state;

the main control module is configured to maintain the current state of the powered device when the wireless control message instructs the turn-off state and the current state of the powered device is the turn-off state; and the main control module is configured to generate the control instruction for changing the current state to the turn-off state when the wireless control message instructs the turn-off state and the current state of the powered device is the turn-on state.

4. The wireless control module according to claim 1, wherein the wireless communication module comprises at least one of:
a communication module having a Zigbee function;
a communication module having a Bluetooth Low Energy (BLE) function;
a communication module having a Wireless Fidelity (WIFI) network function; and
a communication module having an infrared remote control function.

5. The wireless control module according to claim 1, further comprising a power supply module,
wherein the power supply module is configured to convert an alternating current in the live wire into a direct current, and output the direct current to at least one of the main control module, the live wire connection/disconnection detection module, the wireless communication module and the control switch for power supply.

6. The wireless control module according to claim 5, further comprising an energy storage circuit,
wherein the energy storage circuit is configured to store electric energy provided by the power supply module into an energy storage element when the connection/disconnection state of the live wire is a connection state; and supply power to at least one of the main control module, the live wire connection/disconnection detection module, the wireless communication module and the control switch through the energy storage element when the connection/disconnection state of the live wire is a disconnection state.

7. A powered device, comprising the wireless control module according to claim 1.

8. A wireless control system, comprising:
a flash switch, a wireless control module, and a powered device sequentially coupled in series between a live wire and a null line,
wherein the wireless control module is the wireless control module according to claim 1.

9. A wireless control system, comprising:
a flash switch and a powered device sequentially coupled in series between a live wire and a null line;
wherein the powered device comprises the wireless control module according to claim 1.

10. A wireless wall switch, comprising:
a flash switch and a wireless control module sequentially coupled in series between a first wiring terminal and a second wiring terminal,
wherein the wireless control module comprises:

a main control module, a live wire connection/disconnection detection module coupled to the main control module, a wireless communication module coupled to the main control module, and a control switch coupled to the main control module, wherein:

the live wire connection/disconnection detection module is configured to detect a connection/disconnection state of a live wire coupled to the flash switch in series, wherein the flash switch is in a switch-off state when being pressed by external force and in a switch-on state when not being pressed by the external force;

the wireless communication module is configured to receive a wireless control message and upload a current state of a powered device, wherein the wireless control message is configured to control an on/off state of the powered device; and the main control module is configured to perform at least one of:
generating, according to the connection/disconnection state of the live wire and the current state of the powered device, a control instruction for changing the current state; or
maintaining the current state of the powered device or generating the control instruction for changing the current state according to a remote control command instructed by the wireless control message; and
output the control instruction to the control switch;

wherein the live wire connection/disconnection detection module comprises a rectification sub-module, a voltage dividing sub-module, a switch tube, and a buffer, wherein
an input terminal of the rectification sub-module is coupled to the live wire, an output terminal of the rectification sub-module is coupled to an input terminal of the voltage dividing sub-module, an output terminal of the voltage dividing sub-module is coupled to a control terminal of the switch tube, a first connection terminal of the switch tube is coupled to an input terminal of the main control module, and a second connection terminal of the switch tube is grounded;
the switch tube is configured to be in a switch-on state when the live wire is in a connection state and to be in a switch-off state when the live wire is in a disconnection state; and
the buffer is configured to delay an output signal of the switch tube for a target duration and then input the output signal to the main control module;
or
wherein the live wire connection/disconnection detection module comprises a rectification sub-module, a resister-capacitor RC circuit and an analog-to-digital converter, wherein
an input terminal of the rectification sub-module is coupled to the live wire, and an output terminal of the rectification sub-module is coupled to an input terminal of the resister-capacitor RC circuit; and
an input terminal of the analog-to-digital converter is coupled to the rectification sub-module through the RC circuit, and an output terminal of the analog-to-digital converter is coupled to an input terminal of the main control module.

11. The wireless wall switch according to claim 10, wherein:
the main control module is configured to generate the control instruction for changing the current state to a turn-off state when a disconnection state of the live wire is detected and the current state of the powered device is a turn-on state; and the main control module is configured to generate the control instruction for changing the current state to the turn-on state when the disconnection state of the live wire is detected and the current state of the powered device is the turn-off state.

12. The wireless wall switch according to claim 10, wherein:

the main control module is configured to maintain the current state of the powered device when the wireless control message instructs a turn-on state and the current state of the powered device is the turn-on state;

the main control module is configured to generate the control instruction for changing the current state to the turn-on state when the wireless control message instructs the turn-on state and the current state of the powered device is a turn-off state;

the main control module is configured to maintain the current state of the powered device when the wireless control message instructs the turn-off state and the current state of the powered device is the turn-off state; and the main control module is configured to generate the control instruction for changing the current state to the turn-off state when the wireless control message instructs the turn-off state and the current state of the powered device is the turn-on state.

13. The wireless wall switch according to claim 10, wherein the wireless communication module comprises at least one of:

a communication module having a Zigbee function;

a communication module having a Bluetooth Low Energy (BLE) function;

a communication module having a Wireless Fidelity (WIFI) network function; and a communication module having an infrared remote control function.

14. The wireless wall switch according to claim 10, wherein the wireless control module further comprises a power supply module, wherein the power supply module is configured to convert an alternating current in the live wire into a direct current, and output the direct current to at least one of the main control module, the live wire connection/disconnection detection module, the wireless communication module and the control switch for power supply.

15. The wireless wall switch according to claim 10, wherein the wireless wall switch is a type-86 wall switch.

16. The wireless wall switch according to claim 10, further comprising a safety switch, wherein the safety switch is operated in one of a cut-off state in which a pathway between the first wiring terminal and the second wiring terminal is disconnected, or a maintaining state in which the pathway between the first wiring terminal and the second wiring terminal is connected.

* * * * *